(12) United States Patent
Huang

(10) Patent No.: US 11,131,865 B2
(45) Date of Patent: Sep. 28, 2021

(54) EYEGLASS TEMPLE

(71) Applicant: Wen-Tse Huang, Kaohsiung (TW)

(72) Inventor: Wen-Tse Huang, Kaohsiung (TW)

(*) Notice: Subject to any disclaimer, the term of this patent is extended or adjusted under 35 U.S.C. 154(b) by 287 days.

(21) Appl. No.: 16/507,085

(22) Filed: Jul. 10, 2019

(65) Prior Publication Data

US 2021/0011307 A1  Jan. 14, 2021

(51) Int. Cl.
*G02C 5/14* (2006.01)
*G02C 11/04* (2006.01)
*H04R 1/10* (2006.01)
*G02C 11/00* (2006.01)

(52) U.S. Cl.
CPC .............. *G02C 5/14* (2013.01); *G02C 11/04* (2013.01); *G02C 11/10* (2013.01); *H04R 1/1016* (2013.01); *H04R 2420/07* (2013.01)

(58) Field of Classification Search
CPC ... G02C 5/14; G02C 1/00; G02C 5/20; H04R 25/00

USPC ....... 351/158, 123, 121; 2/423, 15; 381/376, 381/381
See application file for complete search history.

(56) References Cited

U.S. PATENT DOCUMENTS 7,735,996 B2 * 6/2010 derZwan ............... H02J 7/0044
351/158

* cited by examiner

*Primary Examiner* — Hung X Dang
(74) *Attorney, Agent, or Firm* — Alan D. Kamrath; Karin L. Williams; Mayer & Williams PC

(57) ABSTRACT

An eyeglass temple on which an accessory device is adapted to be mounted includes a concave portion provided with a plurality of substantially figure 8-shaped jacks abutting and communicating with one another in the lengthwise direction of the eyeglass temple. The accessory device includes a body, a flexible tube connected with the body, and a plug installed at one end of the flexible tube. The plug is detachably coupled with one of the substantially figure 8-shaped jacks. The accessory device can be mounted on the eyeglass temple securely and fixed at an adjustable position adaptively for flexible change of the accessory device and amenity of a pair of eyeglasses worn on a user.

6 Claims, 6 Drawing Sheets

EYEGLASS TEMPLE

BACKGROUND OF THE INVENTION

1. Field of the Invention

The present invention relates to an eyeglass temple unit and, more particularly, to an eyeglass temple on which an accessory device such as Bluetooth headset, reading light and pendant can be mounted.

2. Description of the Related Art

As a tool to correct a user's visual acuity traditionally, a pair of eyeglasses which has been further ameliorated may function as a pair of sunglasses shielding radiation of sunlight or even a fashion accessory.

Moreover, a Bluetooth headset developed for technologies of short-distance wireless communications and music replaying has been applicable to a pair of eyeglasses. In general, a Bluetooth headset is mounted on and integrated with the eyeglass frame of a pair of eyeglasses but not easily replaced at a user's discretion. In other words, a broken-down Bluetooth headset cannot be disassembled from an eyeglass frame of a pair of eyeglasses by a user for repair. Additionally, a Bluetooth headset cannot be removed from a pair of eyeglasses by a user who intends to wear the pair of eyeglasses on which no Bluetooth headset is mounted.

On the other hand, a pair of traditional eyeglasses is short of the feature to mount an accessory device with a specific function such as LED spotlight, LED reading light, pendant and mini speaker on an eyeglass temple.

BRIEF SUMMARY OF THE INVENTION

Thus, an objective of the present invention is to provide an eyeglass temple on which an accessory device such as Bluetooth headset, reading light, pendant and mini speaker can be mounted securely and easily.

To achieve this and other objectives, an eyeglass temple of the present invention is adapted to be mounted by an accessory device and includes a concave portion therein. The concave portion is provided with at least one jack having a substantially figure 8-shaped cross section. The accessory device includes a plug which can be securely and easily coupled with the at least one jack.

In a preferred form, the concave portion extends in a lengthwise direction of the eyeglass temple and is provide with a plurality of substantially figure 8-shaped jacks abutting and communicating with one another in the lengthwise direction of the eyeglass temple. Each of the plurality of jacks is composed of two adjacent and interconnected circular holes. The plug is detachably coupled with one of the substantially figure 8-shaped jacks for flexible change of the accessory device and amenity of a pair of eyeglasses worn on a user.

In a preferred form, the concave portion is provided with at least one magnetic member therein to which the plug adheres magnetically.

In an embodiment, the plug has a substantially figure 8-shaped cross section corresponding to the substantially figure 8-shaped cross section of the jack.

Furthermore, an eyeglass temple unit including an eyeglass temple and an accessory device is provided. The eyeglass temple includes a concave portion therein which is provided with a plurality of substantially figure 8-shaped jacks. The accessory device includes a body, a flexible tube connected with the body, and a plug installed at one end of the flexible tube. The plug is detachably coupled with one of the plurality of substantially figure 8-shaped jacks for positioning the accessory device on the eyeglass temple.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
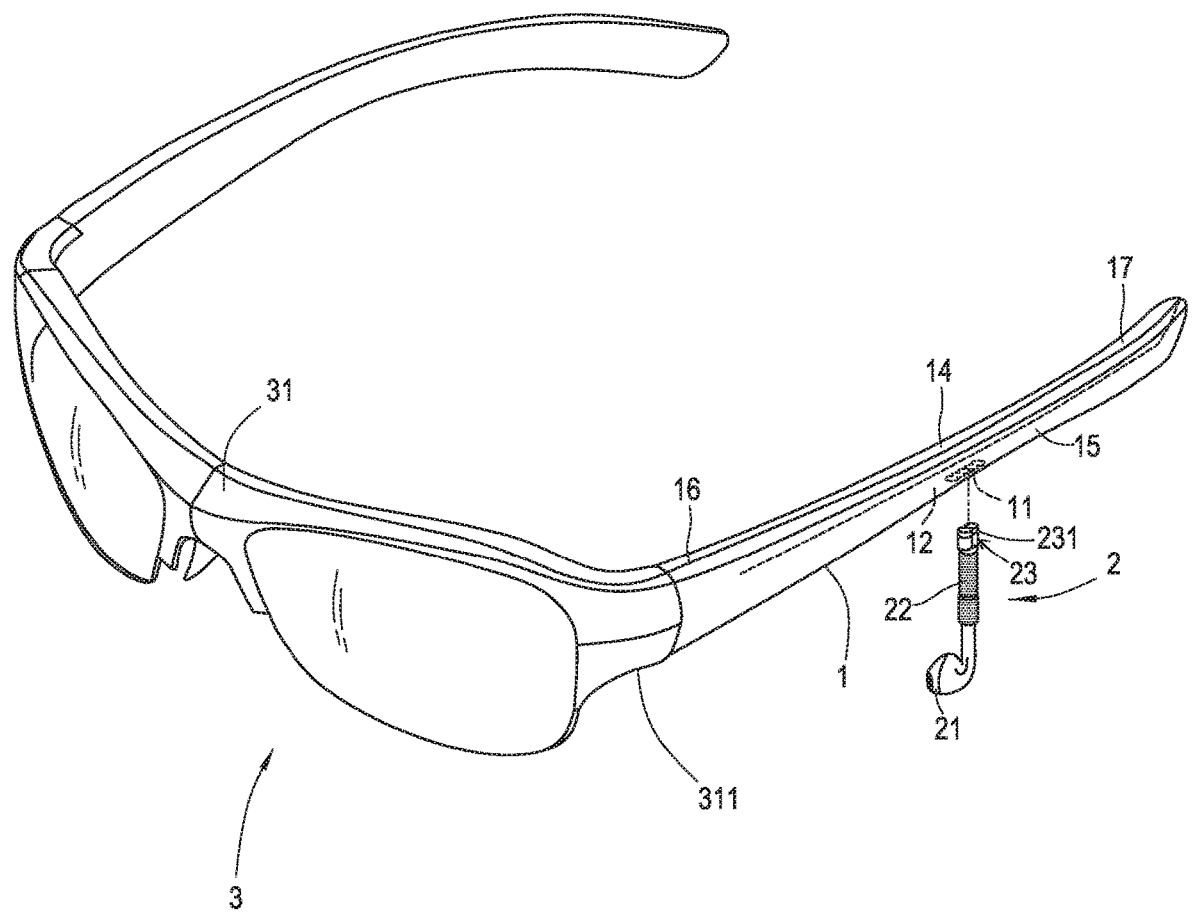
FIG. 1 is a perspective view of a pair of eyeglasses including an eyeglass temple of the present invention and illustrates an add-on Bluetooth headset coupled with the eyeglass temple.
Figure 2:
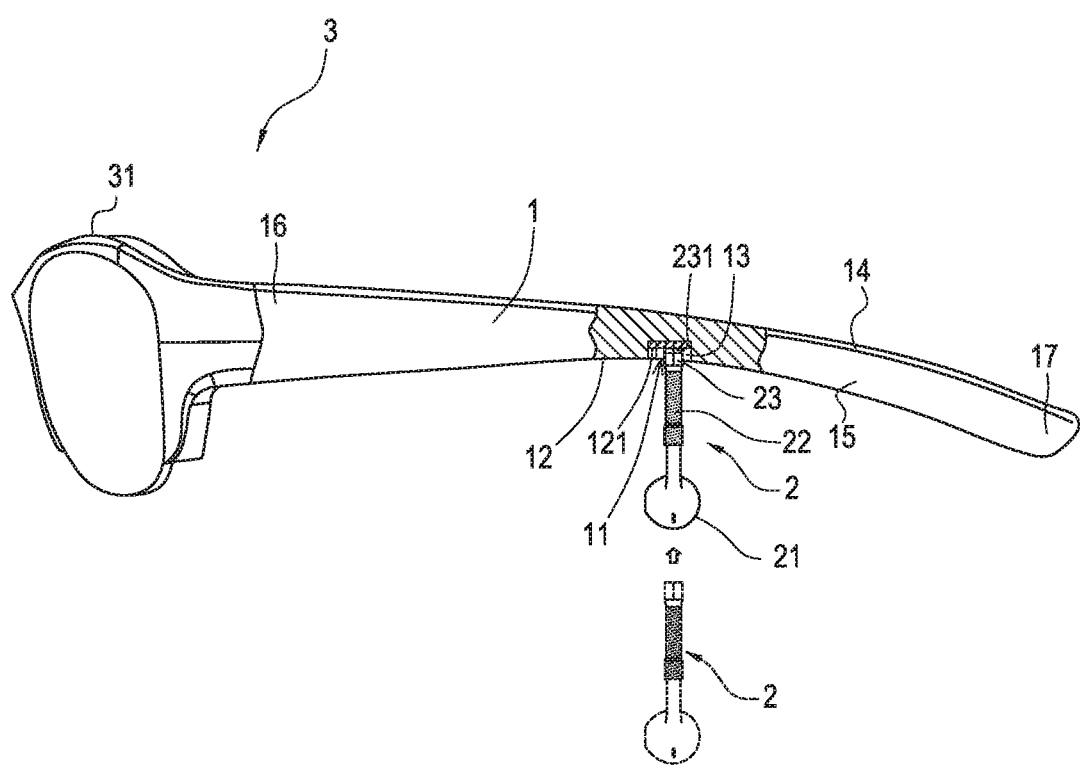
FIG. 2 is a schematic side view of the pair of eyeglasses in FIG. 1, illustrating the Bluetooth headset coupled to the eyeglass temple.

FIGS. 1 and 2 illustrate an eyeglass temple 1 according to an embodiment of the present invention, an accessory device 2 adapted to be mounted on the eyeglass temple 1, and a pair of eyeglasses 3 including the eyeglass temple 1. The pair of eyeglasses 3 can be a pair of sunglasses, leisure glasses, sports glasses, eye protection goggles, myopic lenses, hyperoic lenses or reading glasses. The pair of eyeglasses 3 includes an eyeglass frame 31 and two temples. At least one of the temples is the eyeglass temple 1 of the present invention. The eyeglass frame 31 has two lateral ends 311 with which the two temples are connected, respectively.

In this embodiment, the accessory device 2 is a Bluetooth headset which includes a headset body 21, a flexible tube 22 connected with the headset body 21, and a stiff plug 23 installed at one end of the flexible tube 22. In another embodiment, the flexible tube 22 can be a pliable serpentine tube. The plug 23 is detachably coupled to the eyeglass temple 1. In alternative feasible embodiments, the accessory device 2 can be selected from, without limitation, a mini speaker, an LED spotlight/reading light, and a luminescent pendant.

The eyeglass temple 1 includes a front end 16 and a tail end 17 spaced from the front end 16 in a lengthwise direction of the eyeglass temple 1. The front end 16 is connected with one of the lateral ends 311, and the tail end 17 is worn on a user's ear. The eyeglass temple 1 further includes top and bottom faces 14 and 12 opposite to each other and an outer side 15 back on to a user's face. The eyeglass temple 1 further includes a concave portion 11 extending in the lengthwise direction of the eyeglass temple 1 and formed in the bottom face 12 of the eyeglass temple 1. In a preferable embodiment, the concave portion 11 can be designed in the top face 14 or the outer side 15 of the eyeglass temple 1.

Figure 5:
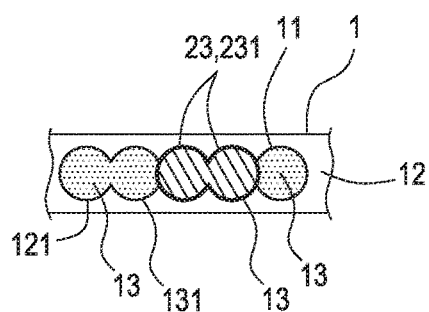
FIG. 5 is a schematic view which illustrates the plug in FIG. 4 coupled with a jack in the eyeglass temple.
Figure 6:
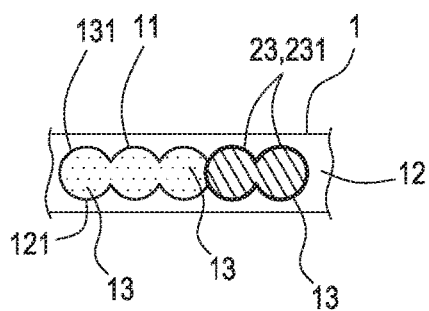
FIG. 6 is a schematic view which illustrates the plug in FIG. 4 coupled with another jack in the eyeglass temple.
Figure 7:
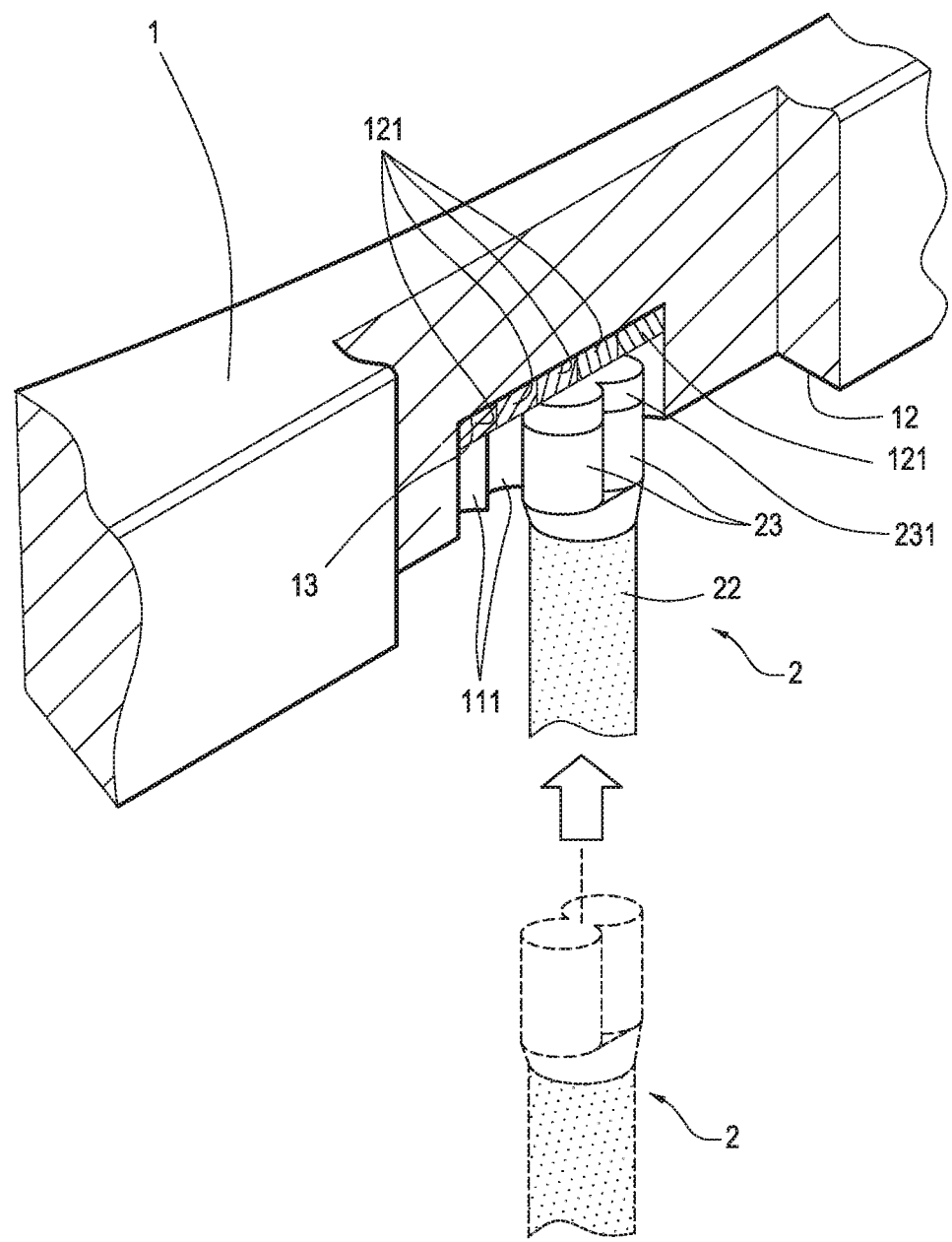
FIG. 7 is a schematic view which illustrates the plug in FIG. 4 coupled with one of the jacks in the eyeglass temple.
Figure 8:
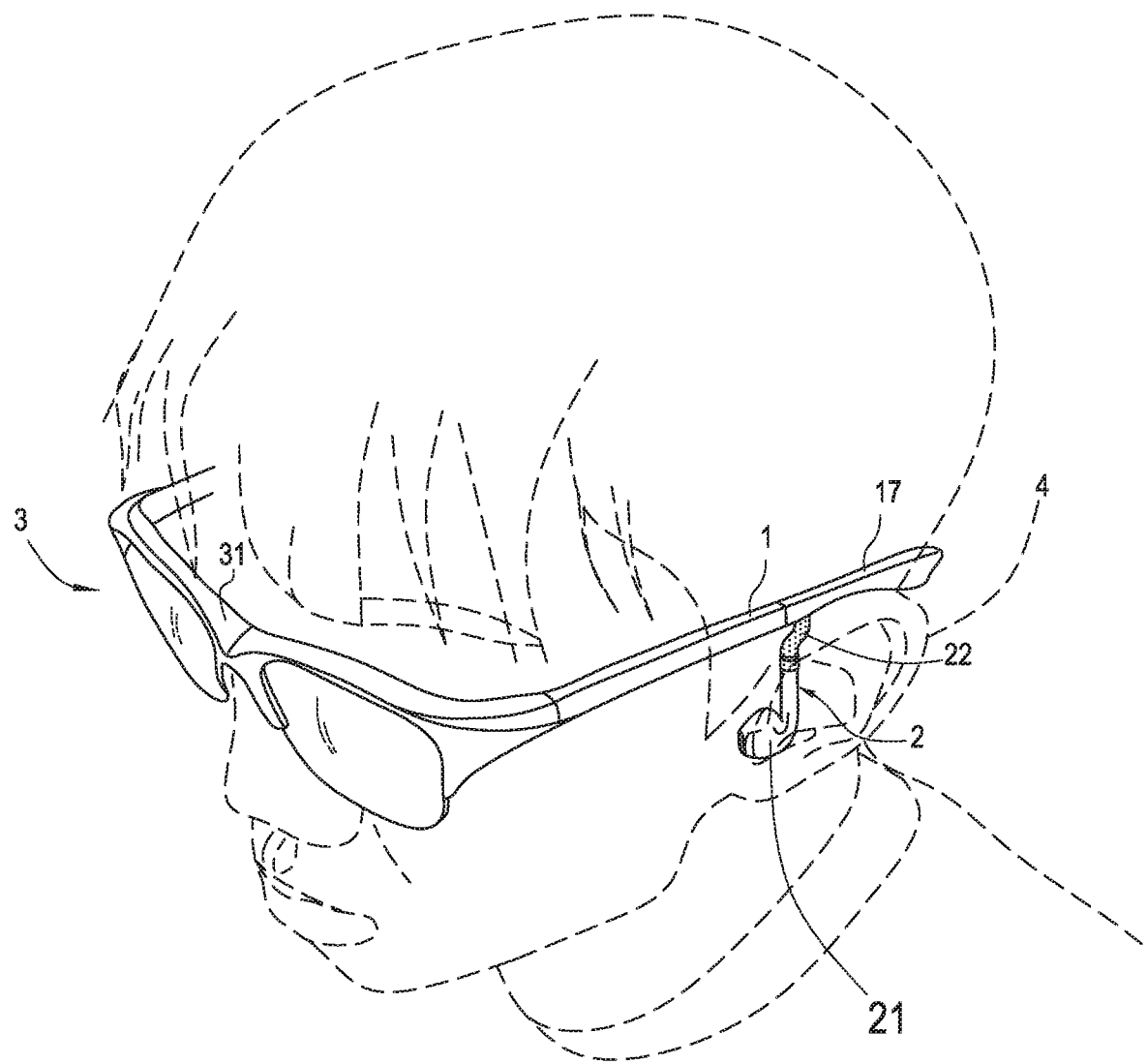
FIG. 8 is a schematic view of the pair of eyeglasses in FIG. 1 worn on a user.

Referring to FIGS. 4 through 7, the concave portion 11 includes at least one jack 13 with a substantially figure 8-shaped cross section for installation of the plug 23. In this embodiment, the concave portion 11 includes four substantially figure 8-shaped jacks 13 abutting and communicating with one another in the lengthwise direction of the eyeglass temple 1, and each of the jacks 13 is composed of two adjacent and interconnected circular holes 131 (FIG. 5). The plug 23 features an essentially figure 8-shaped configuration to be embedded into any jack 13 with the figure 8-shaped cross section correspondingly, as shown in FIGS. 5 and 6. The plug 23 which has been inserted into one of the jacks 13 is supported and immobilized by a circumferential wall 111 around the concave portion 11 and positioned but not turned in the jack 13.

For the accessory device 2 (e.g., a Bluetooth headset) mounted on the eyeglass temple 1 securely and conveniently, at least one magnetic member 121 is installed in the concave portion 11 for magnetic binding with the plug 23. In this embodiment, the magnetic member 121 is a magnet installed at an inner wall of each jack 13 (FIG. 2). A magnetic attraction element 231 is formed at an outer end of the plug 23 and can be magnetically engaged with the magnetic member 121, such that the plug 23 can be coupled with any jack 13 securely and the accessory device 2 is fixed on the eyeglass temple 1 firmly. In a feasible embodiment, the plug 23 is provided with a magnet at the outer end thereof to which the magnetic member 121 inside the concave portion 11 adheres.

Figure 3:
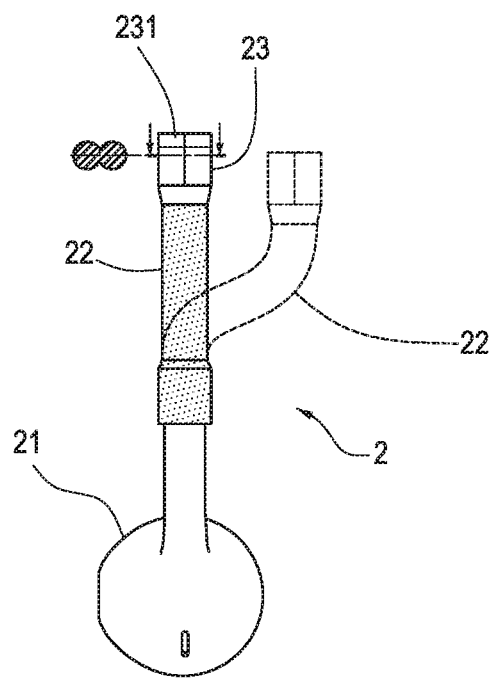
FIG. 3 is a schematic view which illustrates a flexible tube of the Bluetooth headset in FIG. 1 being pliable.
Figure 4:
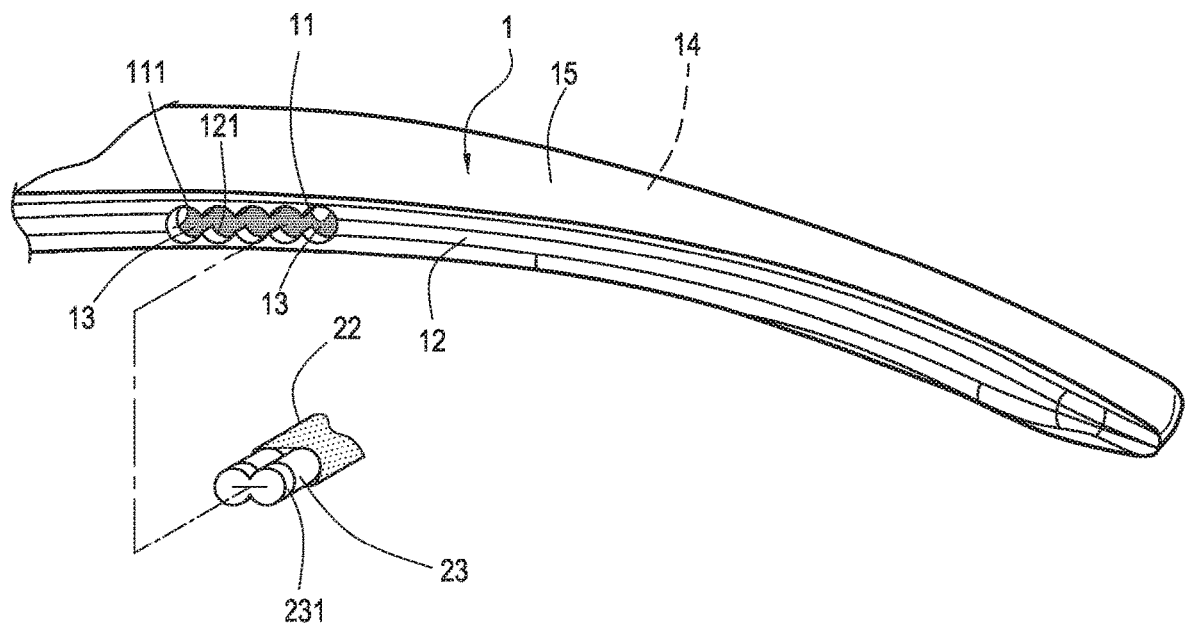
FIG. 4 is a schematic bottom view of the eyeglass temple of the present invention and illustrates a plug of the Bluetooth headset in FIG. 1.

As shown in FIG. 8, the plug 23 can be inserted into and positioned in one of the substantially figure 8-shaped jacks 13 when the headset body 21 of the accessory device 2 is placed in an ear canal by a user wearing the pair of eyeglasses 3. For example, the plug 23 can be inserted into the jack 13 in the concave portion 11 nearest to or farthest away from an ear 4 of a user wearing the pair of eyeglasses 3 for an adjustable mechanism by which a user wearing the pair of eyeglasses and the Bluetooth headset feels comfort. Moreover, the flexible tube 22 connected with the headset body 21 which has been placed in a user's ear canal can be bent moderately (FIG. 3), such that the plug 23 is easily aligned with the jack 13 to be connected. The accessory device 2, for example, a Bluetooth headset, does not fall from the eyeglass temple 1 with which the accessory device 2 is securely coupled if the headset body 21 is separated from or drawn out of a user's ear canal in exercise or body movement incidentally. It should be mentioned that the connectivity between the plug 23 and the jack 13 involves no communications of electronic signals.

Figure 9:
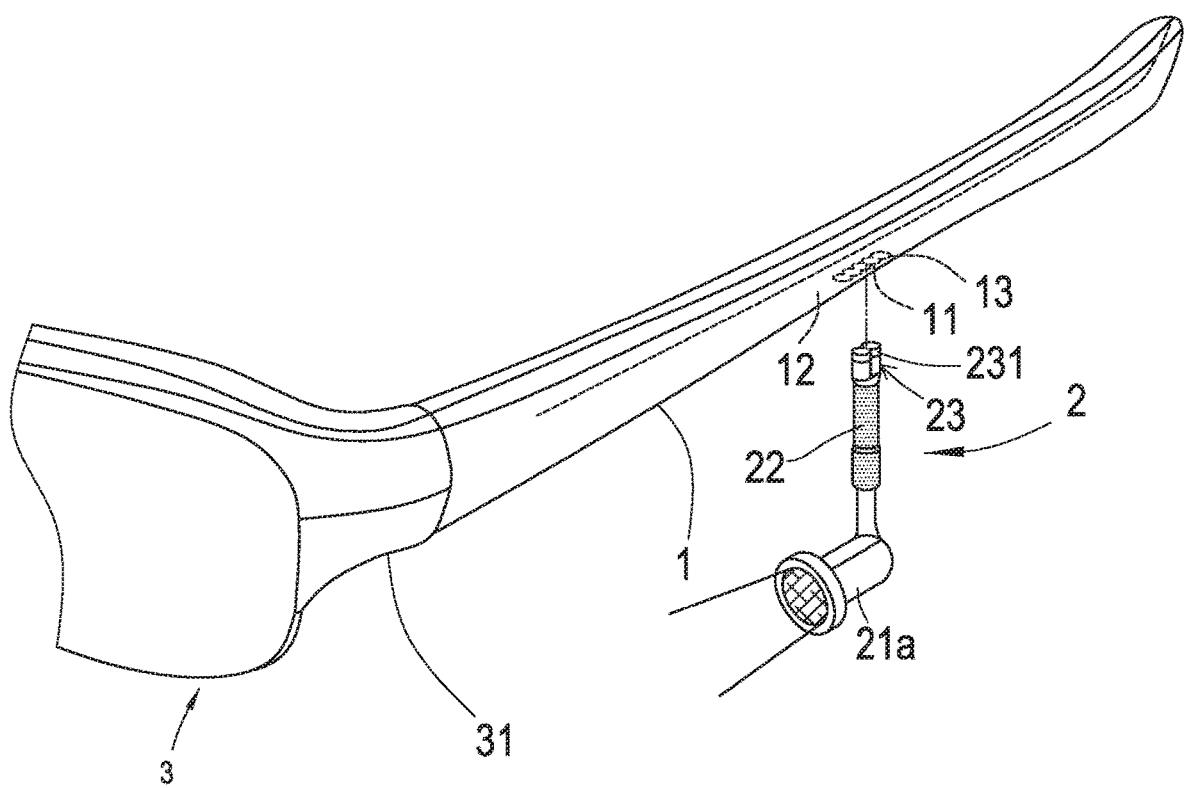
FIG. 9 is a partial, perspective view of the pair of eyeglasses in FIG. 1 and illustrates an LED light mounted on the eyeglass temple of the present invention.

FIG. 9 illustrates an accessory device 2 in the second embodiment. In this embodiment, the accessory device 2 is an add-on LED light and includes a light body 21a, a flexible tube 22 connected with the light body 21a, and a plug 23 installed at one end of the flexible tube 22. The light body 21a is a compact LED light, and the plug 23 can be engaged in one of the jacks 13 in the concave portion 11 so that the LED light is installed at the eyeglass temple 1 securely and easily.

Figure 10:
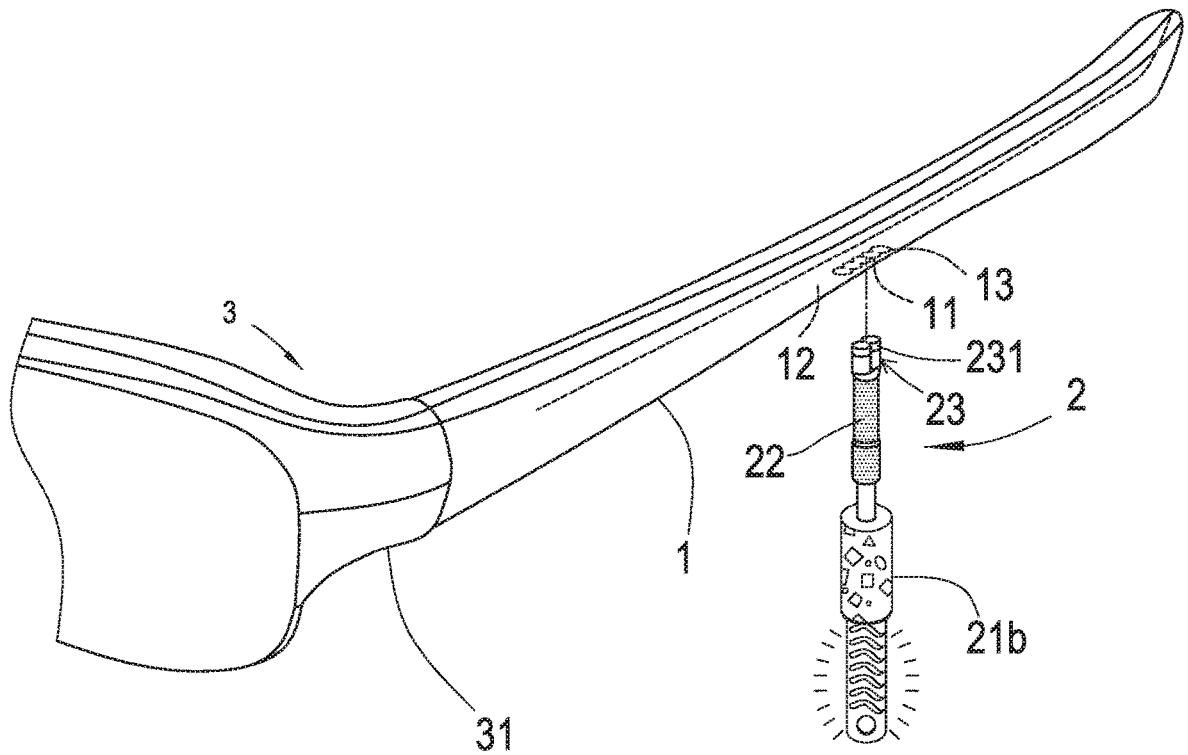
FIG. 10 is a partial, perspective view of the pair of eyeglasses in FIG. 1 and illustrates a pendant installed on the eyeglass temple of the present invention.

FIG. 10 illustrates an accessory device 2 in the third embodiment. In this embodiment, the accessory device 2 is a luminescent pendant and includes a pendant body 21b, a flexible tube connected with the pendant body 21b, and a plug 23 installed at one end of the flexible tube 22. The pendant body 21b is a decoration bulb, and the plug 23 can be engaged in one of the jacks 13 in the concave portion 11 so that the decoration bulb is installed at the eyeglass temple 1 securely and easily.

The scope of the invention is to be indicated by the appended claims, rather than by the foregoing description, and all changes which come within the meaning and range of equivalency of the claims are intended to be embraced therein.

The invention claimed is:

1. An eyeglass temple on which an accessory device is adapted to be mounted, with the accessory device including a plug, wherein the eyeglass temple comprising a concave portion therein, with the concave portion having at least one jack with a substantially figure 8-shaped cross section for detachable combination of the plug, wherein the concave portion extends in a lengthwise direction of the eyeglass temple and has a plurality of substantially figure 8-shaped lacks abutting and communicating with one another in the lengthwise direction of the eyeglass temple, with each jack composed of two adjacent and interconnected circular holes.

2. The eyeglass temple as claimed in claim 1, wherein the concave portion is provided with at least one magnetic member therein to which the plug adheres magnetically.

3. The eyeglass temple as claimed in claim 1, further comprising top and bottom faces opposite to each other, wherein the concave portion is formed in the bottom face of the eyeglass temple.

4. The eyeglass temple as claimed in claim 1, wherein the accessory device further includes a headset body and a flexible tube connected with the headset body, with the plug installed at one end of the flexible tube and having a substantially figure 8-shaped cross section corresponding to the substantially figure 8-shaped cross section of the at least one jack.

5. An eyeglass temple unit, comprising:
an eyeglass temple including a concave portion therein which has at least one jack with a substantially figure 8-shaped cross section; and
an accessory device including a body, a flexible tube connected with the body, and a plug installed at one end of the flexible tube and detachably coupled with the at least one jack for positioning the accessory device on the eyeglass temple,
wherein the concave portion extends in a lengthwise direction of the eyeglass temple and is provide with a plurality of substantially figure 8-shaped jacks abutting and communicating with one another in the lengthwise direction of the eyeglass temple, with the plug selectively engaged in one of the plurality of substantially figure 8-shaped lacks.

6. The eyeglass temple unit as claimed in claim 5, wherein the concave portion is provided with at least one magnetic member therein to which the plug adheres magnetically.

* * * * *